June 12, 1956 J. P. LEKAS ET AL 2,750,578

MAGNETIC DISC DATA STORAGE DEVICE

Filed Jan. 7, 1952

INVENTORS
JOHN P. LEKAS
BY LESTER L. KILPATRICK

William R. Lane
ATTORNEY 2,750,579

MAGNETIC DISC DATA STORAGE DEVICE

John P. Lekas, Hollywood, and Lester L. Kilpatrick, Downey, Calif., assignors to North American Aviation, Inc.

Application January 7, 1952, Serial No. 265,254

16 Claims. (Cl. 340—174)

This invention relates to a data storage device, wherein the degree of magnetization of a strip of magnetizable material is caused to vary in response to an electrical signal which constitutes the information to be stored, and particularly to a device which will store data useful to digital computing work and release it in a form suitable for use as an input to other digital computer sections.

It is desirable to store such information in a manner wherein amplification of the stored information is unnecessary. In the past, it has been proposed to store such information by variably magnetizing high remanence magnetic material on the surface of a cylindrical drum. By remanence is meant that quality of a material which causes it to remain magnetized after the ambient forcing magnetic field is reduced to zero. All such schemes heretofore proposed, however, have been undesirable due to the physical limitations imposed by the configuration of the drum. The energy level of the signal generated by release of the information from a drum invariably requires amplification.

This invention contemplates the use of a disc instead of a drum which will obtain the desired degree of magnetization upon the high remanence material and adequately store a large quantity of information in a small space upon said material.

In magnetic data storage devices, it is customary to designate the electromagnets used for impressing magnetic signals onto the high remanence material or for extracting the signals from the impressed material as magnetic recording heads and magnetic reading heads, respectively. When cylindrical drums are used, special heads requiring several laminations are necessary in order to generate a sufficiently high intensity magnetic field to impress a usable signal upon the surface of the high remanence material painted, plated, or otherwise attached to the outside of the drum, and to efficiently extract the signal so impressed. Use of a large amount of ferromagnetic material, even though laminated, results in high eddy current and hysteresis losses.

This invention contemplates a device in which it is necessary to use only a single lamination to obtain the desired result. By combining a disc and a novel single-lamination magnetic head assembly of this invention in the manner herein described it is possible to achieve the same magnetic field strength over a smaller area of the magnetized medium with less magnetomotive force than is possible with a drum, and to extract with high efficiency the signal so impressed, thus, increasing the storage capacity of a given area of the high remanence material.

In order to achieve the results described, it is necessary to carefully align and closely space the disc and the magnetic head assembly. To do this satisfactorily it is necessary to use special alignment devices of an improved and superior nature.

There are, in general, two common methods of placing a magnetic signal on a high remanence material. The first method is to cause the high remanence material to pass between poles of the exciting magnet, thereby magnetizing the high remanence material in a direction normal to the plane of the high remanence material. The second method is to pass the high remanence material as close as possible to a magnetic head wherein the poles of the head are very closely spaced and the flux between the poles passes in a direction parallel to the movement of the high remanence material. The signal is then impressed upon the high remanence material by virtue of the leakage flux adjacent to the magnetic head, and is magnetized in a direction parallel to its direction of motion in the plane of the material. A third possible but less common method is to impress the signal upon the high remanence material by using leakage flux as outlined in the second method, above, in a direction perpendicular to its direction of motion in the plane of the material.

It is therefore a primary object of this invention to provide means for securing an output signal many times larger than that obtained from any prior similar device.

It is another object of this invention to provide means for closely spacing information upon high remanence magnetic material at a density many times greater than that obtained from any prior similar device.

It is another object of this invention to provide means for concentrating magnetic flux at any desired spot adjacent to the surface of a disc which carries a high remanence material to be magnetized for the storage of information, and to provide a return path of large cross-sectional area for the magnetic flux to keep the flux density extremely low in order not to interfere with the degree of magnetization of adjacent channels on the high remanence material.

It is a further object of this invention to provide a magnetic head assembly for magnetizing in a direction parallel to the direction of motion of a disc, and in the plane of the disc, high remanence material attached thereto, wherein an output signal and information density may be obtained many times larger than that obtained from any prior similar device.

It is a further object of this invention to provide a mechanical means for accurately aligning a disc perpendicular to its axis of rotation.

It is still another object of this invention to provide a means for maintaining uniform spacing between a medium to be magnetized and magnetic heads provided for recording on and releasing information from the medium.

Other objects of invention will become apparent from the following description taken in connection with the accompanying drawings, in which.

Figure 8:
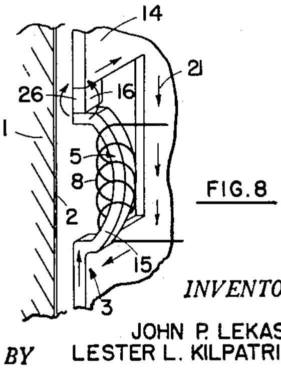

And Fig. 8 is a schematic drawing showing the direction of magnetic flux flow when one particular embodiment of this invention is used for magnetizing high remanence material in the plane of the high remanence material.

Figure 1:
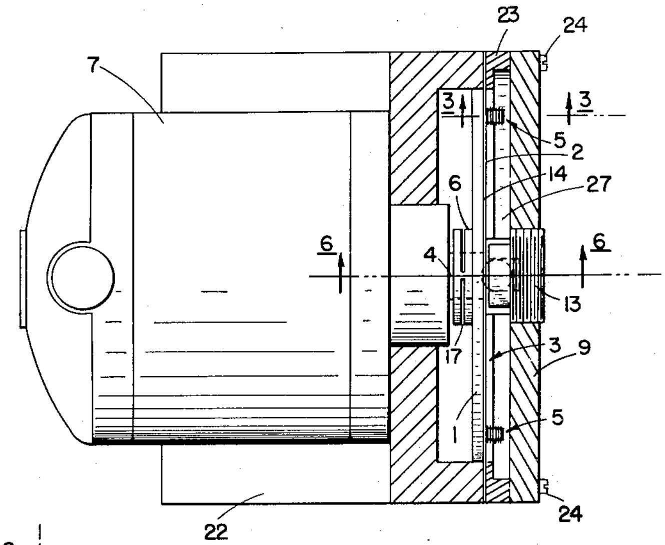
Fig. 1 is a cross-sectional drawing of one embodiment of the magnetic disc data storage device.

Referring to Fig. 1, prime mover 7 turns drive shaft 4, coupling and aligning device 6 and disc 1, on which high remanence material 2 is painted, plated, or otherwise attached. Adjacent, parallel, and very close to high remanence material 2 is magnetic head assembly 3 comprising single lamination 14 common to all of magnetic heads 5. Each magnetic head 5 has a core comprising tab 15 rising out of lamination 14 and being an integral part thereof. Tab 15 forms a small loop and returns to the plane of lamination 14 on the side next to high remanence magnetic material 2. Each head 5 has a coil 8 which is used as an exciting coil to supply a changing magnetic field if head 5 is a recording head, and which acts as a detector coil to detect changing magnetic fields if head 5 is a reading head. Because lamination 14 is very thin, it is necessary to support lamination 14 and tab 15 in a fixed position. Mechanical head assembly support plate 23 is provided for this purpose. All parts between prime mover 7 and magnetic head assembly support plate 23 are enclosed in assembly housing 22. Backing plate 9 is attached externally to magnetic head assembly support plate 23. Housing screws 24 pass through backing plate 9 and support plate 23 into housing 22, thereby holding the entire device together. Backing plate screw 13 passes through backing plate 9 having a socket 12 on its inner face, wherein spherical spacing ball 11 fits against pressure plate 25 at the bottom of socket 12. Spacing ball 11 fits into socket 10 on the end of drive shaft 4. By turning backing plate screw 13, shaft 4 is forced to move axially several ten-thousandths of an inch, thus creating the desired spacing between disc 1 and magnetic head assembly 3.

Figure 2:
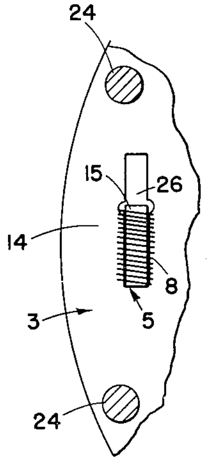
Fig. 2 is a partial plan view of the magnetic head assembly shown in Fig. 1.

Referring to Fig. 2, positioning of head 5 relative to lamination 14 is shown. If magnetization of high remanence material 2 in Fig. 1 is desired in a direction normal to the plane of high remanence material 2, spacing 26 will be very large compared to the spacing between the end of tab 15 and high remanence material 2. If magnetization is desired in the plane of high remanence material 2, spacing 26 will be very small and will be filled with nonmagnetic material 16 shown in Fig. 8. It must be noted that a plurality of heads 5 may be positioned radially and circumferentially on magnetic head assembly 3.

Figure 3:
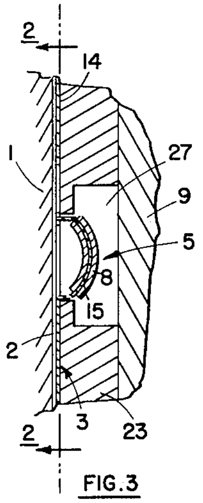
Fig. 3 is a sectional view of the magnetic head assembly of this invention taken at 3—3 in Fig. 1.

Referring to Fig. 3, the relative position of lamination 14, head tab 15 and coil 8 may be discerned. This figure shows in detail the manner in which support plate 23 rigidly supports thin lamination 14 and head tab 15. The space between head 5 and backing plate 9 is used for wiring and may be filled with a potting compound. Wire may be brought out through sockets (not shown) in backing plate 9.

Figure 4:
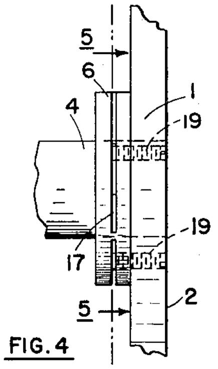
Fig. 4 shows the details of a coupling device for aligning a disc perpendicular to its axis of rotation.
Figure 5:
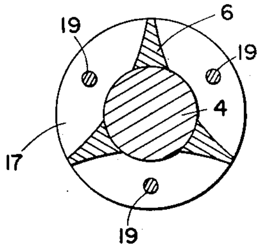
Fig. 5 is a cross-sectional view of the device shown in Fig. 4 taken at 5—5 in Fig. 4.

Referring to Figs. 4 and 5, coupling 6 is rigidly attached to disc 1. Three set-screws 19 pass through disc 1 into the portion of coupling 6 next to disc 1, penetrating into slots 17 then resting firmly against the portion of coupling 6 farther away from disc 1. Slots 17 are machined into coupling 6 leaving only enough solid material to carry the load of disc 1. Set-screws 19 are positioned midway between the load-carrying portions which separate individual slots 17. Adjustment of set-screws 19 cause concentrated loads to be applied halfway between ends of individual slots 17 to the portion of coupling 6 farther away from disc 1, which in turn bends in flexure as a beam supported at its two ends, thereby causing coupling 6 to tighten against shaft 4 at the point of contact between shaft 4 and the portion of coupling 6 farther away from disc 1, whereby disc 1 may be aligned perpendicular to its axis of rotation by varying the adjustments of set-screws 19.

Figure 6:
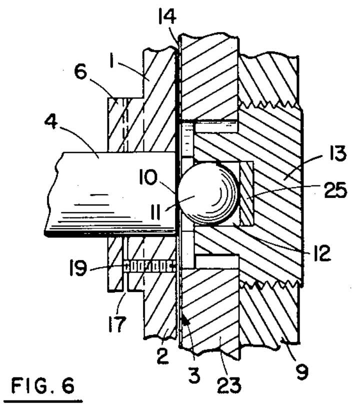
Fig. 6 is a cross-sectional view of the device shown in Fig. 1 taken at 6—6 in Fig. 1.

Referring to Fig. 6, a detailed view of the method of spacing disc 1 and a plate or lamination 3 adjacent and parallel to disc 1 when disc 1 is perpendicular to its axis of rotation may be observed.

Figure 7:
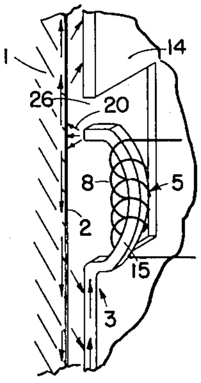
Fig. 7 is a schematic drawing showing the direction of magnetic flux flow when one particular embodiment of this invention is used for magnetizing high remanence material in a direction perpendicular to the plane of the high remanence material.

Referring to Fig. 7, distribution of magnetic flux and its direction of flow may be observed from arrows 20, where magnetization normal to the plane of high remanence material 2 is desired. It should be noted that the magnetic field intensity is very high at the end of pole-piece tab 15 passing through high remanence material 2 into ferromagnetic disc material 1, diffusing in all directions then returning across the gap between disc 1 and lamination 14 at a very low field intensity. It should be noted that gap 26 is very large compared to the gap between the end of pole piece 5 and high remanence material 2.

Referring to Fig. 8, the direction and magnitude of magnetic flux when magnetization is desired in the plane of high remanence material 2 is shown by arrows 21. It should be noted that disc 1 is of nonmagnetic material and that gap 26 is extremely small (shown here in exaggerated proportion). Gap 26 is filled by nonmagnetic material 16 in order to hold very close tolerances. Thus, a very high field is generated across gap 26 between pole-piece tab 15 and lamination 14, magnetizing high remanence material 2, which is in close proximity to gap 26, by the leakage flux around gap 26. A low magnetic field intensity return path is provided by the large cross-sectional area of lamination 14.

The close spacing of information upon high remanence material 2 is achieved in this invention by using a very small pole-piece tab 15 made from a single lamination. A single lamination is adequate in this device, because a very low magnetomotive force is required to create a high flux density. Very low magnetomotive force is required in this invention to create a high flux density because of the extremely short spacing between head 5 and high remanence material 2. Short spacing without touching is achieved in this device by special alignment and spacing means shown in Figs. 4, 5, and 6. Due to the close spacing and alignment mentioned above, another achievement of this device is to provide an output signal many times larger than any similar device heretofore constructed.

The operation of this invention will be described in the following discussion.

One common method of storing information is to impress voltages representing the desired information onto the electrical coil of an electromagnet with a ferromagnetic core. The ferromagnetic core modifies the shape of the magnetic field and may be used to concentrate it into a small cross-sectional area. If a material having a high remanence characteristic is brought into the high intensity field the material becomes magnetized in proportion to the applied field intensity and remains magnetized if removed from the vicinity of the field. If the high remanence material is moved through a recording field at a uniform velocity, said field being caused by changes in voltage across the excitation coil of the recording head, the variations of excitation voltage will be transferred to the high remanence material in the form of variation of degree of magnetization thereof. The magnetized path will, in reality, be a plot of the information desired to be stored against time, because the high remanence material passes through the recording field at a uniform velocity. At another point on the track a similar magnetic head, used as a reading head, may be placed. Movement of the high remanence material will cause voltages to be induced in the coil of the reading head which are proportional to the change of intensity of the magnetic field passing under the reading head at any particular time. It may be seen from the inverse square law of magnetism that the closer the high remanence material passes to the recording head the higher the degree of magnetization which will be impressed upon the high remanence material for a given magnetomotive force; and the closer the high remanence material passes to the reading head, the stronger will be the induced voltage in the coil of the reading head. The degree of success with which close spacing can be achieved with a cylindrical arrangement which requires that the spacing between each head and the cylinder be individually adjusted, depends upon eccentricities of the cylinder, the rigidity of the bearings, and the thermal expansion of the cylinder. Thermal expansion of a cylinder is very significant because the linear movement of the cylinder in a radial direction is not only directly proportional to the absolute temperature of the cylinder but is also directly proportional to the radius of the cylinder. The advantages of using a disc instead of a cylinder are readily apparent. The disc may be machined flat to a few spectral lines, if necessary, and may be aligned into a plane perpendicular to its axis of rotation by special techniques with the help of alignment devices claimed in this invention. Thus, with a disc, the magnetic heads may also be machined flat and with one adjustment spaced very close to the disc within several ten-thousandths of an inch without being affected by eccentricity, small deviations in the drive shaft bearing or thermal expansion. Thermal expansion, in a disc, although also directly proportional to the absolute temperature, is only proportional to the thickness of the disc which may be made as thin as mechanically expedient. It may therefore be seen that the thermal expansion effects of the disc are very small compared to those of the cylinder. With a cylindrical arrangement, a high magnetic field is required because of the wide spacing between the magnetic heads and the high remanence material on the outside surface of the cylinder. In order to obtain a high degree of magnetization in the high remanence material, it is necessary to use a considerable quantity of ferromagnetic material in the magnetic heads, requiring lamination of the heads to reduce eddy current losses. Because of the large amount of ferromagnetic material required, the field of the magnetic head may not be concentrated into a very small cross-sectional arrangement. When a disc instead of a cylinder is used in the manner set forth in this invention, the magnetic heads require less magnetomotive force to obtain a high flux density. Because of the close spacing between each head and the high remanence material, a single, thin lamination is all that is required in this invention to provide the desired flux density to impress a high level signal on the high remanence material. By the device described in this invention individual signals may be impressed closer together or at a higher density than that possible with a multilamination head because of the small size of a single lamination.

In this invention a high degree of magnetization is accomplished when magnetization normal to the plane of the high remanence material is desired, by fabricating the disc 1 of ferromagnetic material. Magnetic flux is concentrated between the open end of tab 15 and a point on disc 1 directly opposite, then spreads out through disc 1, and returns across the gap between disc 1 and lamination 14 at a greatly weakened field strength.

In this invention a high degree of magnetization is accomplished where magnetization of the high remanence material in the plane of the high remanence material is desired, by fabricating the disc 1 of nonmagnetic material. By spacing the end of tab 15 on magnetic head 5 as close as possible to lamination 14 and firmly spacing tab 15 in a fixed position by insertion of nonmagnetic material 16 between the end of tab 15 and lamination 14, the direction of flow of magnetic flux is directly off the end of tab 15 to lamination 14 without passing through disc 1. Because high remanence material 2 passes close to gap 26 filled by nonmagnetic material 16, a high degree of magnetization of high remanence material 2 is accomplished by virtue of leakage flux around the edge of gap 26.

Although the invention has been described and illustrated in detail, it is to be clearly understood that the same is by way of illustration and example only and is not to be taken by way of limitation, the spirit and scope of this invention being limited only by the terms of the appended claims.

We claim:

1. Means for recording data in magnetic form upon high remanence magnetic material comprising a shaft, a disc attached to said shaft, a prime mover connected to rotate said shaft, a coating of high remanence magnetic material on one surface of said disc, means for accurately aligning the plane of said disc perpendicular to the axis of rotation of said shaft, a plurality of magnetic heads, means for holding said magnetic heads in close proximity to said high remanence magnetic material, means for providing a common magnetic return path for said heads, said heads being bonded to said common magnetic return path means to concentrate magnetic flux at each of said heads, whereby said high remanence magnetic material is caused to become magnetized in response to electrical signals supplied to said heads and changing concentrations of magnetic field strength on said high remanence magnetic material is detected by said heads.

2. Means for recording data with improved resolution in magnetic form upon high remanence magnetic material, said material being attached in a layer to the face of a disc of high permeability material comprising a prime mover, a disc, rotation means for connecting said prime mover and said disc, high remanence magnetic material attached to said disc, a flat lamination of high permeability material, means for holding said lamination precisely parallel to said disc, means for holding said lamination at a fixed predetermined distance from said disc, a plurality of means for producing concentrated magnetic flux at predetermined positions in the plane of said lamination in response to said data in electrical form, said data being impressed upon said disc in magnetic form across the gap between said disc and said lamination, said disc and said lamination providing a low flux density return path for said flux whereby said data is recorded normal to the plane of said high remanence magnetic material and reproduced with high resolution.

3. Means for recording data with improved resolution in magnetic form upon high remanence magnetic material comprising a rotatable disc of nonmagnetic material, high remanence magnetic material attached in a layer to the face of said nonmagnetic disc, rotation means for rotating said disc in a plane perpendicular to its axis of rotation, a flat lamination of high permeability material, means for holding said lamination precisely parallel to said disc, means for holding said lamination at a fixed predetermined distance from said disc, a plurality of means for producing concentrated magnetic flux at predetermined positions in the plane of said lamination in response to said data in electrical form thereby impressing said data upon said high remanence magnetic material in magnetic form by virtue of leakage flux adjacent said flux producing means whereby said data is recorded in magnetic form parallel to the plane of said high remanence magnetic material and is extracted with high resolution.

4. A device for recording data on high remanence magnetic material comprising a disc of ferromagnetic material, said high remanence magnetic material being attached to a face of said disc, means for rotating said disc, magnetic recording heads constructed of a single lamination precisely spaced in close proximity to the surface of said disc upon which said high remanence magnetic material is attached, means for holding said heads and said lamination extremely close to the face of said disc to supply an adequate amount of magnetic flux to impress a usable signal upon said high remanence magnetic material and whereby data may be recorded on said high remanence magnetic material normal to the plane of said high remanence magnetic material and thereafter extracted from said high remanence magnetic material with high resolution.

5. A device as recited in claim 4 in which said means for holding said heads comprises a rigid support, a spacing ball, and adjustable screw means attached to said support and bearing against said spacing ball, said spacing ball positioned against the center of said disc thereby positioning said heads relative to said disc by adjusting said screw means relative to said support.

6. A device for recording data in magnetic form on high remanence magnetic material comprising a disc, said high remanence magnetic material being attached to the face of said disc, rotation means connected to turn said disc, magnetic heads, means for spacing said magnetic heads in close proximity adjacent said high remanence magnetic material to cause the magnetic flux passing between the poles of said heads to magnetize said high remanence magnetic material in the plane of said high remanence magnetic material, adjustable support means for said heads to adjust the spacing between said heads and said high remanence magnetic material so close that only a single lamination is required in order to supply the necessary magnetizing flux for recording said data on said high remanence magnetic material and to provide the necessary sensitivity to extract the information impressed upon said high remanence magnetic material, and electric coil means wound upon said heads to create said magnetic field and to detect changes in said magnetic field due to said data recorded on said high remanence magnetic material, said close spacing allowing said head to be extremely small whereby information impressed upon said high remanence magnetic material may be spaced very close together.

7. In a magnetic recording device a magnetic head assembly comprising a single disc-shaped lamination, a plurality of magnetic recording and reading heads radially and circumferentially spaced thereon, tabs of said lamination rising out of the plane of said lamination in the form of a loop and returning through said lamination forming the core of said heads, and electric coils wound around said tabs through the loops formed by said tabs to provide information to be stored in magnetic form in said magnetic recording device and to detect said stored information, the spacing between the end of said tabs and said lamination being variably spaced whereby the distribution of magnetic flux flow may be controlled.

8. In a disc type magnetic recorder having a plurality of magnetic heads and a disc, means for spacing said magnetic heads extremely close to the surface of said disc comprising a framework for supporting said heads, a spacing ball, a socket in the center of said disc upon the axis of rotation of said disc, a cylindrical screw attached to the center of said framework, a socket in the center of said screw, a spacing ball between said socket upon said disc and said socket in the face of said cylindrical screw whereby adjustment of said screw against said spacing ball determines the clearance between said disc and the face of said heads and whereby the spacing between said disc and all of said heads may be adjusted simultaneously.

9. Means for recording data in magnetic form upon high remanence magnetic material comprising a shaft; a disc attached to said shaft; a prime mover connected to rotate said shaft; a coating of high remanence magnetic material upon one surface of said disc; means for accurately aligning the plane of said disc perpendicular to the axis of rotation of said shaft; a plurality of magnetic heads; a common magnetic return path of a single lamination of ferromagnetic material, the cores of said heads comprising tabs of said lamination rising out of the plane of said lamination and returning through said lamination to form a point of high magnetic flux concentration opposite said high remanence magnetic material; means for holding said magnetic heads and said lamination in close proximity to said high remanence magnetic material; and a coil of wire wrapped around each said tab for establishing various magnetic flux densities at the end of said tab opposite said high remanence magnetic material when each said head is used as a recording head and for detecting changes of magnetic field intensity opposite said end of said tab when each said head is used as a reading head whereby said high remanence magnetic material is caused to become magnetized in response to electrical signals applied to said head and changing concentrations of magnetic field strength on said high remanence magnetic material are detected by said heads.

10. Means for recording data in magnetic form upon high remanence magnetic material comprising a shaft; a disc attached to said shaft; a prime mover connected to rotate said shaft; a coating of high remanence magnetic material upon one surface of said disc; means for accurately aligning the plane of said disc perpendicular to the axis of rotation of said shaft; a plurality of magnetic heads; means for providing a common magnetic return path for said heads, said heads being bonded to said common magnetic return path means to concentrate said magnetic flux at each of said heads; a mechanical head assembly; a support plate connected to said magnetic heads to support them; a backing plate connected to said support plate; a backing plate, said backing plate screw passing through said backing plate; a socket on the inner face of said backing plate screw; a pressure plate, said pressure plate fitting into said socket; a spherical socket in the center of said shaft; and a ball, said ball fitting into said spherical socket and into said socket on the inner face of said backing plate screw to cause said shaft to move axially by an amount corresponding to the adjustment of said backing plate screw whereby said high remanence magnetic material is caused to become magnetized in response to electrical signals supplied to said head and changing concentrations of magnetic field strength on said high remanence magnetic material are detected by said heads.

11. Means for recording data in magnetic form upon high remanence magnetic material comprising a shaft; a disc attached to said shaft; a prime mover connected to rotate said shaft; a coating of high remanence magnetic material on one surface of said disc; a plurality of magnetic heads; means for holding said magnetic heads in close proximity to said high remanence magnetic material; means for providing a common magnetic return path for said heads, said heads being bonded to said common magnetic return path means to concentrate magnetic flux at each of said heads; a coupling attached to said heads adjacent said shaft extending parallel to the axis of and surrounding said shaft in a direction toward said prime mover; three slots in said coupling on the same plane perpendicular to the axis of said disc, said slots spaced equally around the circumference of said coupling extending from the outside of said coupling inward to said shaft leaving enough solid material between said slots to carry the load of said disc; and three set screws passing through said disc in a direction parallel to the axis of said shaft, penetrating into said coupling and said slot, coming to rest against the portion of said coupling farther away from said disc, said set screws being circumferentially positioned to enter each of said slots midway between said load carrying portions so that relative adjustment of said set screws aligns the plane of said disc perpendicular to its axis of rotation and tightens said coupling about said shaft at the lowest point of contact between said coupling and said shaft whereby said high remanence magnetic material is caused to become magnetized in response to electrical signals applied to said head and changing concentrations of magnetic field strength on said high remanence magnetic material are detected by said head.

12. Means for recording data with improved resolution in magnetic form upon high remanence magnetic material comprising a rotatable disc of nonmagnetic material; high remanence magnetic material attached in a layer to the face of said nonmagnetic disc; rotation means for rotating said disc in a plane perpendicular to its axis of rotation; a flat lamination of high permeability material; means for holding said lamination precisely parallel to said disc; means for holding said lamination at a fixed predetermined distance from said disc; a plurality of tabs at predetermined positions on said lamination, each of said tabs being an integral part of said lamination rising out of the plane of said lamination, forming a loop and returning through said lamination to a point opposite said high remanence magnetic material, the ends of each of said tabs being in a plane with the side of said lamination opposite said disc and being spaced extremely close to said lamination; nonmagnetic spacing material, said spacing material being placed between the ends of each of said tabs and the major portion of said lamination to rigidly hold said spacing; and a conductive coil wrapped around each of said tabs for producing a variable magnetic field in response to said data in electrical form and for detecting changes in magnetic field intensity at the ends of each of said tabs whereby said data is recorded in magnetic form parallel to the plane of said high remanence magnetic material and extracted from said remanence magnetic material with high resolution.

13. Means for recording data in magnetic form upon magnetic material comprising a disc of magnetic material; means attached to said disc for rotating it; a single lamination of ferromagnetic material aligned parallel to and closely spaced from said disc; and a plurality of magnetic heads the cores of which are tabs of said single lamination rising out of the plane of said lamination upon the side of said lamination away from said disc and returning through the plane of said lamination to a point opposite said disc whereby when the coils of said magnetic heads are energized said disc is caused to be magnetized in response to electrical signals supplied to said coils and changing concentrations of magnetic field strength on said disc are detected by said heads.

14. A magnetic head assembly comprising a single lamination of ferromagnetic material; a plurality of tabs of said lamination perforated therein and rising out of the plane of said lamination and returning through the perforations in said lamination to form a point of high magnetic flux concentration; and a coil of wire wrapped around each said tab for establishing variable magnetic flux densities at the ends of said tabs when each said head is used as a recording head and for detecting changes of magnetic field opposite said end of said tab when each said head is used as a reading head.

15. In a magnetic recording device a magnetic head assembly comprising a single lamination; a plurality of magnetic recording and reading heads spaced upon said lamination, tabs of said lamination rising out of the surface of said lamination in the form of a loop and returning through said lamination to form the cores of said heads; and electric coils wound around said tabs through the loop formed by said tabs to provide information to be stored in a magnetic form in said magnetic recording device and to detect said stored information, means for spacing the ends of said tabs and said lamination, whereby the distribution of magnetic flux flow is controlled.

16. In combination, a magnetic recording medium having an exposed surface, means translatable relative to and along said surface including a lamination of ferromagnetic material conformant to said surface and having a perforation therein, a tab integral with said lamination extending into said perforation and means for varying the magnetic flux density in said tab to thereby variably magnetize said medium.

References Cited in the file of this patent

UNITED STATES PATENTS

| | | |
|---|---|---|
| 392,209 | Lee | Nov. 6, 1888 |
| 2,479,308 | Camras | Aug. 16, 1949 |
| 2,504,454 | Rothweiler | Apr. 18, 1950 |
| 2,523,515 | Porter | Sept. 26, 1950 |
| 2,546,821 | Hansen | Mar. 27, 1951 |
| 2,546,829 | Malina | Mar. 27, 1951 |
| 2,564,403 | May | Aug. 14, 1951 |